(12) United States Patent
Kronberger et al.

(10) Patent No.: US 11,225,946 B2
(45) Date of Patent: Jan. 18, 2022

(54) METHOD FOR ADJUSTING AN ADJUSTMENT DEVICE OF A WIND POWER PLANT

(71) Applicant: B&R INDUSTRIAL AUTOMATION GMBH, Eggelsberg (AT)

(72) Inventors: Peter Kronberger, Eggelsberg (AT); Friedrich Forthuber, Eggelsberg (AT); Alexander Festerling, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 170 days.

(21) Appl. No.: 16/800,433

(22) Filed: Feb. 25, 2020

(65) Prior Publication Data
US 2020/0271092 A1   Aug. 27, 2020

(30) Foreign Application Priority Data

Feb. 27, 2019   (EP) .................................... 19159737

(51) Int. Cl.
*F03D 7/02* (2006.01)
*F03D 15/00* (2016.01)

(52) U.S. Cl.
CPC ........... *F03D 7/022* (2013.01); *F03D 7/0204* (2013.01); *F03D 15/00* (2016.05)

(58) Field of Classification Search
CPC ......... F03D 7/022; F03D 7/0204; F03D 15/00
See application file for complete search history.

(56) References Cited

U.S. PATENT DOCUMENTS 8,371,976 B2 *  2/2013  Watanabe ............... F16H 57/12
                                                                 475/5
2011/0138945 A1   6/2011  Watanabe

FOREIGN PATENT DOCUMENTS

EP           2 495 435      9/2012
EP           2 101 058      5/2015
WO        2018/091144       5/2018

OTHER PUBLICATIONS

Europe Search Report/Office Action conducted in counterpart Europe Appln. No. EP 19159737 (dated Aug. 22, 2019).

* cited by examiner

*Primary Examiner* — Michael L Sehn
(74) *Attorney, Agent, or Firm* — Greenblum & Bernstein, P.L.C.

(57) ABSTRACT

In order to be able to better control the movement of the movable part of the wind power plant during an adjustment, the drive axles are tensioned against each other prior to the adjustment by rotating at least one drive axle relative to the other drive axles, and the drive axles are rotated together in the same direction of rotation during the adjustment the drive axles while maintaining the tensioning of the drive axles by way of a position control, until the desired end position of the movable part is reached.

14 Claims, 4 Drawing Sheets

METHOD FOR ADJUSTING AN ADJUSTMENT DEVICE OF A WIND POWER PLANT

CROSS-REFERENCE TO RELATED APPLICATIONS

The present application claims priority under 35 U.S.C. § 119(a) of Europe Patent Application No. EP 191 59 737.6 filed Feb. 27, 2019, the disclosure of which is expressly incorporated by reference herein in its entirety.

BACKGROUND

1. Field of the Invention

The present invention relates to a method for adjusting an adjustment device of a wind power plant, by which a movable part of the wind power plant is rotated, wherein the adjustment device includes at least two drive axles, each having a drive motor and which are mechanically coupled to the movable part. The invention also relates to a wind power plant having such an adjustment device.

2. Discussion of Background Information

Wind power plants generally have adjustment devices for various movable parts of the wind power plant, such as a rotor blade adjustment mechanism or an azimuth adjustment mechanism, in order to adapt the wind power plant to changing wind conditions (windspeed, wind direction, etc.) and thus, inter alia, to be able to increase the energy output. Such adjustment devices often have several smaller interacting drive motors instead of a single large drive motor. The drive motors usually act on a common ring gear via a drive pinion in order to adjust the movable part of the wind power plant. The ring gear is often arranged to be stationary—for example, on the tower in the case of an azimuth adjustment mechanism, or on the hub of a nacelle (as a quasi-stationary part) for a rotor blade adjustment mechanism. The drive motors with the drive pinion are arranged on the movable part. However, this arrangement can also be reversed. The movable part and the stationary part are connected to each other via a bearing—either a roller bearing or a plain bearing. Between the drive motor and drive pinion there is usually also a drive transmission, often a planetary gearing, which functions as a torque converter—that is, the high rotation speed and the low torque of the drive motor are converted into high torque and low speed in the drive pinion. In addition, a braking device, usually an adjusting brake which is most commonly hydraulic, is frequently provided—in particular, where a roller bearing is used—in order to be able to brake or hold the movable part of the wind power plant. In cases where a plain bearing is used, typically no (most commonly, hydraulic) braking device is provided. A stationary brake disc can be provided in the braking device, with brake calipers arranged on the movable part acting on said brake disc. This arrangement can be reversed as well. Additionally or alternatively, the drive motors can also be equipped with holding brakes.

There is a great deal of mechanical play and high elasticity in a drive axle of an adjustment device of a wind power plant, that is, a drive motor, optionally a drive transmission, and the toothing between the drive pinion and ring gear. For example, play in the range of 0.5 mm to 1 mm is not uncommon between the teeth of the drive pinion and the ring gear. In addition, the drive axle has high transmission ratios, typically on the order of 1:20,000. It is necessary to first overcome the play and elasticities in the drive axle to transmit torque from the drive motor to the ring gear. This may require many revolutions of the drive shaft of the drive motor. For this reason, the adjustment of the adjustment device, in particular when under wind load, is more complicated than it appears. If the hydraulic brake of the adjustment device and/or the holding brakes of the drive motors are released, the wind can turn the movable part in an uncontrolled manner in the direction of motor rotation until the play and the elasticities are overcome and the drive motors can transmit a torque to the ring gear. To prevent this, the adjustment brake is not opened fully in wind power plants having adjustment brakes, such that a residual braking torque counteracts an uncontrolled adjustment movement. However, this produces wear on the adjustment brake and leads to excessive noise (squeaking), due to the partially released adjustment brake, which can also lead to problems with the certification of the wind turbine.

In order to remedy this problem, EP 2 101 058 B1 has already suggested controlling at least one adjustment drive at a different rotation speed than the other adjustment drives, such that this first adjustment drive produces a braking torque. In this way, the adjustment drives are tensioned and the mechanical play and the elasticities are overcome. The adjustment drives are designed as electric motors controlled by a frequency converter whereby the rotation speed or the torque can be set. The disadvantage in this case is that the applied braking torque is fixed. At low wind loads, this braking torque is usually too high, which makes this type of adjustment inefficient in terms of the energy used. At high wind loads, the braking torque can still be overcome by the external load when the adjustment device is adjusted, and the movable part of the adjustment device may be moved in an uncontrolled manner. Due to the rotation speed control or torque control, the tensioning would be released and control over the movement of the movable part (e.g. the nacelle) can be lost.

SUMMARY

Therefore, embodiments provide a method and an adjustment device for adjusting a movable part of a wind power plant, with which the movement of the movable part of the wind power plant can be controlled during the adjustment.

In embodiments, prior to the adjustment, the drive axles are tensioned against each other by rotating at least one drive axle relative to the other drive axles, and during the adjustment the drive axles are rotated together in the same direction of rotation by a position control while maintaining the tensioning of the drive axles until the desired end position of the movable part is reached. The tensioning prior to the actual adjustment establishes a defined position of the drive axles relative to each other. The following position control maintains the tensioned state because all the drive axles are always rotated together in the same direction with position control. For the position control, angular position sensors are used in the drive axles, which detect the angular positions of the drive axles, for example, the drive motors, which are processed in the position control as actual position values of the position control. The position control ensures that the adjustment can always be carried out in a controlled manner because the positions, i.e. the angular positions of the drive axles, are controlled directly.

In addition, the position control also ensures that the drive axles brake automatically when high wind tries to accelerate the movable part of the wind power plant in the direction of rotation. This is particularly advantageous in an embodiment where the total torque of the drive axles is directed against the movement, if the wind becomes so strong that the wind accelerates the movable part against the braking effect, the other drive axles then provide braking assistance due to the position control. This prevents an uncontrolled movement of the movable part due to the wind.

It is advantageous if during the tensioning a desired total torque is set as the sum of the individual drive torques of the drive axles, in particular, if the total torque counteracts the desired movement of the movable part. The total torque thus has a braking effect and acts as damping during the adjustment.

The tensioning is preferably carried out by rotating at least one drive axle in the direction of rotation opposite that of the other drive axles, or by rotating all the drive axles in the same direction of rotation, wherein at least one drive axle is rotated more slowly than the other drive axles, or by holding at least one drive axle while the other drive axles are rotated.

The tensioning is advantageously maintained by maintaining relative positions of the drive motors of the drive axles with respect to each other, which positions are reached by the position control during tensioning.

It is particularly advantageous if one drive axle is defined as the master drive axle and the other drive axles follow the movement of the master drive axle. This can ensure that the relative positions of the drive axles with respect to each other are maintained particularly precisely because the slave drive axles follow the actual movement of the master drive axles.

For the adjustment, it is particularly advantageous if the drive axles are re-tensioned between the tensioning and the start of the adjustment, as this compensates for any undesirable changes in the tensioning state before the adjustment, thereby ensuring a particularly good and secure adjustment.

Embodiments are directed to a method for adjusting an adjustment device of a wind power plant to rotate a movable part of the wind power plant, the adjustment device having at least two drive axles, each having a drive motor and being mechanically coupled to the movable part. The method includes tensioning the at least two drive axles against each other prior to an adjustment by rotating at least one drive axle of the at least two drive axles relative to at least the other drive axle of the at least two drive axles; and during the adjustment, rotating the at least two drive axles together in a same direction of rotation, while maintaining the tensioning of the at least two drive axles, until a desired end position of the movable part is reached.

Moreover, embodiments are directed to a wind power plant having a movable part. The wind power plant includes an adjustment device configured to rotate the movable part, the adjustment device having at least two drive axles, each having a drive motor and being mechanically coupled to the movable part. At least one of the at least two drive axles is rotated relative to at least the other drive axle of the at least two drive axles for tensioning the at least two drive axles, and the at least two axles are rotated in a same direction of rotation, while maintaining the tensioning of the at least two drive axles, until a desired end position (φS) of the movable part is reached.

Embodiments of the invention are directed to a method for adjusting an adjustment device of a wind power plant to rotate a movable part of the wind power plant, the adjustment device having at least two drive axles, each having a drive motor and being mechanically coupled to the movable part. The method includes tensioning the at least two drive axles against each other prior to an adjustment by rotating at least one drive axle of the at least two drive axles relative to at least the other drive axle of the at least two drive axles; and during the adjustment, using position control of the at least two drive axles to rotate the at least two drive axles together in a same direction of rotation, while maintaining the tensioning of the at least two drive axles, until a desired end position of the movable part is reached.

According to embodiments, the tensioning can be carded out by rotating at least one drive axle in the direction of rotation opposite that of the other drive axles.

In accordance with other embodiments, the tensioning can be carried out by rotating all the drive axles in the same direction of rotation, wherein at least one drive axle is rotated more slowly than the other drive axles.

In embodiments, the tensioning may be carried out by holding at least one drive axle while the other drive axles are rotated.

According to embodiments, the tensioning may be maintained by maintaining the relative positions of the drive motors with respect to each other reached during tensioning of the drive axles. Further, during tensioning, a desired total torque can be set as the sum of the individual drive torques of the drive axles. The total torque counteracts the desired movement of the movable part.

In accordance with embodiments, at least one drive axle may be defined as master drive axle and a number of the other drive axles follows the movement of the master drive axle.

In embodiments, the drive axles can be re-tensioned between the initial tensioning and the start of the adjustment.

In other embodiments, the at least two drive axles can be rotated together via a position control.

Embodiments of the invention are directed to a wind power plant having a movable part that includes an adjustment device configured to rotate the movable part, the adjustment device having at least two drive axles, each having a drive motor and being mechanically coupled to the movable part. At least one of the at least two drive axles is rotated relative to at least the other drive axle of the at least two drive axles for tensioning the at least two drive axles, and a rotation of the at least two drive axles in a same direction of rotation is controlled using position control of the at least two drive axles, while maintaining the tensioning of the at least two drive axles, until a desired end position of the movable part is reached.

According to embodiments, the adjustment device can be at least one of a wind direction tracking mechanism or a rotor blade adjustment mechanism.

In accordance with still yet other embodiments, a drive control unit can be configured tor tensioning the at least two drive axles. Further, a position control of the at least two drive axles may be configured to control rotation of the at least two drive axles to the predetermined set points. The drive control unit can include the position control.

Other exemplary embodiments and advantages of the present invention may be ascertained by reviewing the present disclosure and the accompanying drawing.

BRIEF DESCRIPTION OF THE DRAWINGS

In the following, the present invention is described in greater detail with reference to FIGS. 1 to 6 which, by way of example, show schematic and non-limiting advantageous embodiments of the invention. In the drawings.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The present invention is described, without restricting the generality, using the example of an azimuth adjustment mechanism (wind direction tracking mechanism 7) for the nacelle 3 of a wind power plant 1. Of course, the invention can also be applied to other adjustment devices for a movable part of a wind power plant 1 in which at least two drive axles 11 are provided—for example, the rotor blade adjustment mechanism 6 for adjusting the pitch of the rotor blades 4.

Figure 1:
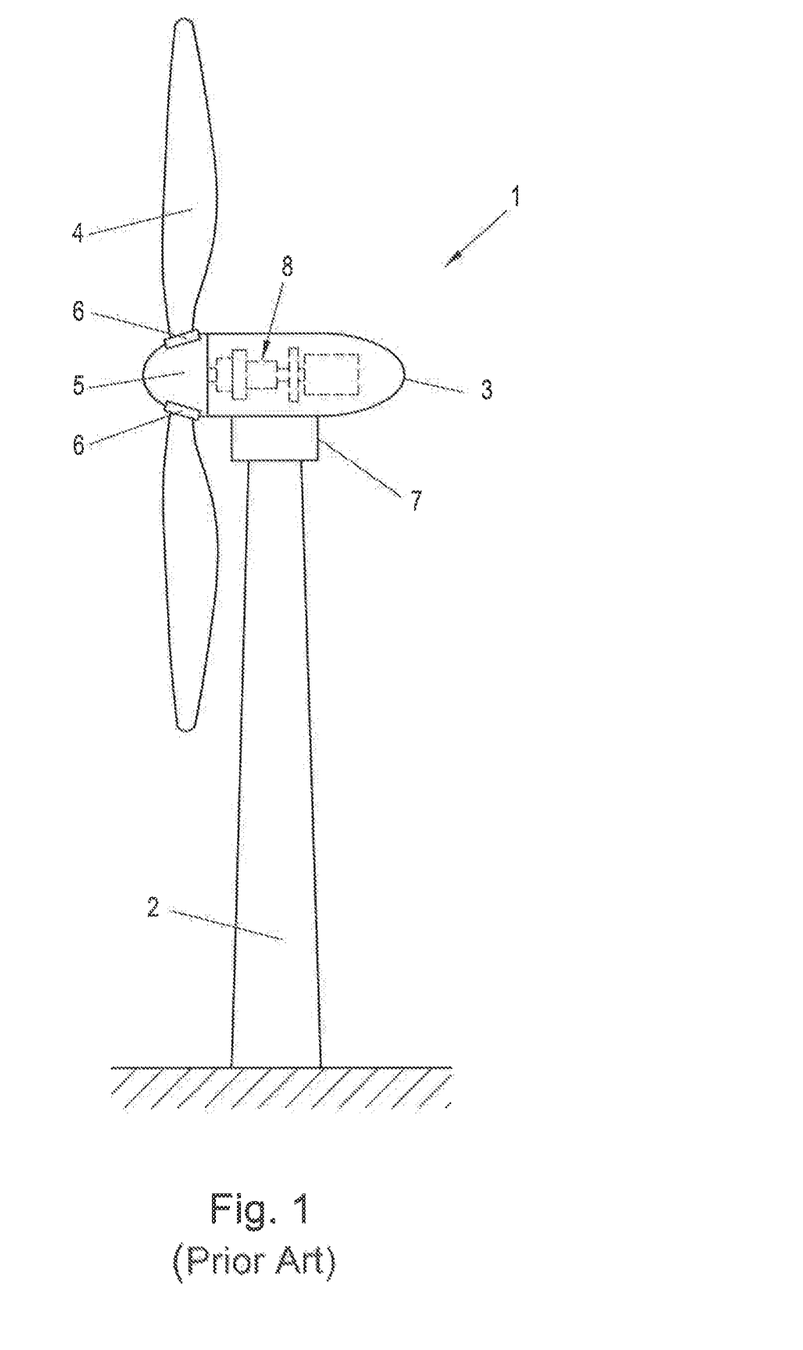
FIG. 1 shows a typical design of a wind power plant.

FIG. 1 shows a typical wind power plant 1 having a fixed tower 2 on which the nacelle 3 is arranged. A drive train 3 is arranged in the nacelle 3, usually including the rotor (hub 5 on which the rotor blades 4 are arranged) and a generator, which are connected to each other by shafts, the shaft of course being mounted accordingly. A transmission and possibly also a brake are often provided in the drive train 8 before the generator. The generator is driven by the rotor. The position of the rotor blades 4 can be adjusted by a rotor blade adjustment mechanism 6 as an adjustment device 10 (see FIG. 2). Likewise, the nacelle 3 is arranged to be rotatable about the vertical axis 18 of the tower 2 by a wind direction tracking mechanism 7 also as an adjustment device 10. The rotor blades 4 or the nacelle 3 thus constitute a movable part of the wind power plant 1 which, if necessary, can be adjusted—specifically, rotated—for example, in order to change the position of the rotor blades 4 according to the current wind, or to move the nacelle 3 to track the current wind direction.

Figure 2:
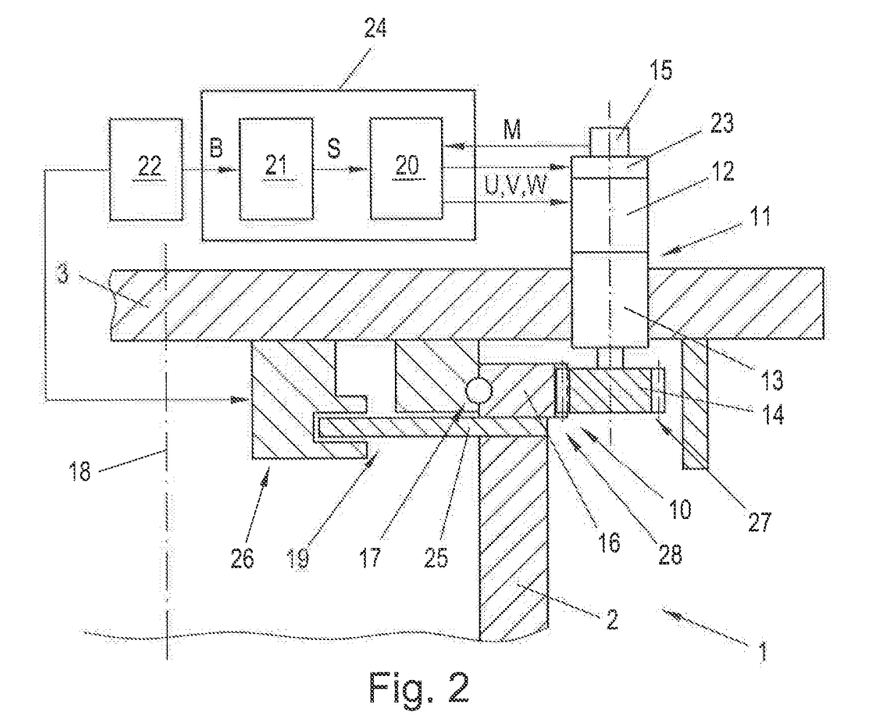
FIG. 2 shows an embodiment of an adjustment device with a drive axle as a wind direction tracking mechanism.

FIG. 2 shows a drive axle 11 of an adjustment device 10 of a movable part of a wind power plant 1, according to the invention—in this case, using the example of a wind direction tracking mechanism 7. The nacelle 3 is rotatably arranged on the tower 2 via a bearing 17—in this case, a roller bearing. The nacelle 3 is thus rotatably mounted about the vertical axis 18 of the tower 2. In addition, an adjustment brake 19 can be provided, for example having a stationary brake disc 25 on the tower 2 and, for example, having hydraulic, actuatable brake calipers 26 on the nacelle 3, which can interact with the brake disc 25 for braking. The drive shaft 11 is mechanically coupled to the movable part of the wind power plant 1 for the adjustment, for example in order to rotate the movable part. The bearing 17 can of course also be designed as a plain bearing and the adjustment brake 19 can also be omitted.

The drive axle 11 includes a drive motor 12 which drives a movable coupling part 27—in the embodiment shown, a drive pinion 14—as shown in FIG. 2. The drive motor 12 can be an electric motor, for example an asynchronous motor, such as a squirrel-cage motor, or a synchronous motor, such as a permanent magnet-excited or electromagnetically excited synchronous motor. The drive motor 12 can also be a hydraulic motor or any other suitable motor. A drive transmission 13, for example a planetary gearing, is usually also provided between the drive motor 12 and the coupling part 27 (drive pinion 14). For mechanical coupling, the drive pinion 14 interacts with a coupling part 28 arranged in a stationary manner on the tower 2—in the embodiment shown, a ring gear 16 having external teeth. When the drive pinion 14 is rotated, the nacelle 3 can consequently be rotated relative to the tower 2, for example in order for the nacelle 3 to track the direction of the wind. The adjustment device 10 includes at least two such drive axles 11, each drive axle 11 acting on the same stationary coupling part 28 (ring gear 16). Of course, this arrangement is only an example and can also be designed in any other way. For example, the ring gear can be designed with an internal toothing. Likewise, the ring gear 16 can be arranged on the nacelle 3 (that is, it can be moved with the nacelle) and the drive axles 11 fixed on the tower 2. A drive motor 12 can also be designed with an electrical, pneumatic or hydraulic holding brake 23. In this way, a drive axle 11 can also be held independently of or in addition to an adjustment brake 19. The specific embodiment is not essential to the invention.

Instead of a drive pinion 14 and a ring gear 16 for mechanical coupling, other movable coupling parts 27 and stationary coupling parts 28 for mechanical coupling between the drive axle 11 and the movable part of the wind power plant 1 are of course also possible, for example friction wheels, belt drives or chain drives, each of which is driven by the drive motor 12.

Figure 3:
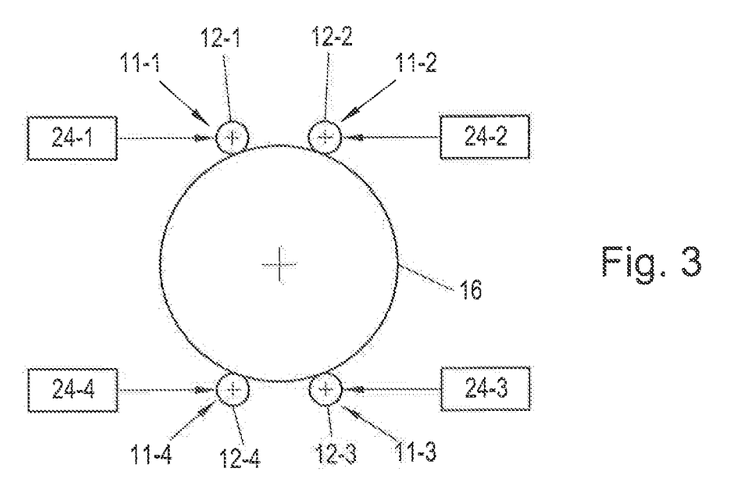
FIG. 3 shows an arrangement of drive axles in the adjustment device.

According to the invention, at least two drive axles 11 are provided for the adjustment device 10, for example four drive axles 11-1, 11-2, 11-3, 11-4 as shown in FIG. 3 (wherein only the drive motors 12-1, 12-2, 12-3, 12-4 are illustrated, for the purpose of simplification).

As explained at the outset, there can be a large amount of mechanical play in a drive axle 11, in particular the tooth play between the drive pinion 14 and the ring gear 16, and possible tooth play in the drive transmission 13 or play in other mechanical couplings. Here can as well be great elasticity, for example due to the transmission ration and the torsional stiffness. In order to be able to transmit a rotary movement of the drive motor 12 to the movable part of the wind power plant 1, the play and the elasticities must first be overcome. For example, all the tooth flanks of all the active gears would first have to fit closely in the direction of rotation. Only then can the movable part of the wind power plant 1, in this case the nacelle 3, be moved by a drive axle 11. However, this may require a large number of revolutions of the drive motor 12. This can lead to considerable problems in the movement and actuation of the adjustment device 10, in particular because large external, dynamic wind forces can act as a load of the adjustment device 10 at the same time.

In order to solve this problem, according to the invention a position control of the drive axles 11 is used. The angular position of the drive motor 12 is controlled by the position control of a drive axle 11. A position control of a drive axle 11 is substantially characterized in that a position feedback from the drive motor 12 (or equivalent of another part of the drive axle 11) is provided, which is processed in a drive control unit 24 (hardware and/or software), for example including a drive amplifier 20 (hardware and/or software) and an adjustment control unit 21 (hardware and/or software), to set the angular position of the drive motor 12 (or equivalent another part of the drive axle 11). The drive amplifier 20 can also be integrated into the drive motor 12. For position feedback, an angular position sensor 15 can he provided on the drive motor 12, delivering a sensor value M as the actual position value from which the angle of rotation of the drive motor 12 can be deduced. Such angular position sensors 15 are well known in various designs, for example, as rotary encoders or resolvers. The drive amplifier 20 generates the required manipulated variables for the drive motor 12, for example electrical power for an electrical drive motor 12, for example three-phase voltages U, V, W for a three-phase electric motor as the drive motor 12, in order to implement the desired rotary movement at any time. Of course, other manipulated variables can be used for other types of drive motors 12, for example actuating commands for hydraulic valves or for a hydraulic pump in the case of a hydraulic motor. The drive amplifier 20 can also process control signals S for position control, which are provided, for example, by an adjustment control unit 21 (hardware and/or software). The drive control unit 24, or an adjustment control unit 21, can in turn be controlled by a main controller 22 of the wind power plant 1. The drive control unit 24 or adjustment control unit 21 can of course also be implemented in the main controller 22, for example as software. The adjustment control unit 21 and the drive amplifier 20 can be implemented as shared hardware. It is also possible to implement the adjustment control unit 21, the drive amplifier 20 and the main controller 22 as shared hardware. Likewise, several drive amplifiers 20 can be implemented in shared hardware that is actuated by an adjustment control unit 21. In an advantageous embodiment, an adjustment control unit 21 is provided which actuates at least one drive amplifier 20-1, 20-2, 20-3, 20-4, a group of drive amplifiers 20-1, 20-2, 20-3, 20-4, or all of the drive amplifiers 20-1, 20-2, 20-3, 20-4 of the drive axles 11-1, 11-2, 11-3, 11-4 (see FIG. 5). The drive control unit 24-1, 24-2, 24-3, 24-4 of each drive axle 11-1, 11-2, 11-3, 11-4 then includes, for example, the same adjustment control unit 21 and one of the drive amplifiers 20-1, 20-2, 20-3, 20-4. A drive amplifier 20 or an adjustment control unit 21, or generally the drive control unit 24, can also control any holding brake 23 of the drive motor 12 that may be present.

The adjustment method of the adjustment device 10 according to the invention will be explained with reference to FIG. 4 using the example of an adjustment device 10 having four drive axles 11-1, 11-2, 11-3, 11-4 (as in FIG. 3).

At the beginning of the adjustment, any existing holding brakes 23 of the drive motors 12-1, 12-2, 12-3, 12-4 are preferably closed and any adjustment brakes 19 that are present are closed. At time $t_0$, the higher-level main controller 22 issues the command B for the adjustment to the drive control unit 24-1, 24-2, 24-3, 24-4 of the drive axles 11-1, 11-2, 11-3, 11-4, in the embodiment described, to the adjustment control unit 21, which actuates at least one drive amplifier 20-1, 20-2, 20-3, 20-4. Subsequently, any existing and closed holding brakes 23 are released as a preparatory action.

As a first step of the method according to the invention, the drive axles 11-1, 11-2, 11-3, 11-4 are tensioned prior to the actual adjustment, preferably when the movable part of the wind power plant 1 is at a standstill. For this purpose, at least one drive axle 11-1 is rotated relative to the other drive axles 11-2, 11-3, 11-4. For example, at least one drive axle 11-1 can be moved in the direction of rotation opposite that of the other drive axles 11-2, 11-3, 11-4 for the tensioning. Alternatively, tensioning can be implemented by rotating all the drive axles 11-1, 11-2, 11-3, 11-4 in the same direction of rotation, wherein at least one drive axle 11-1 is rotated more slowly than the other drive axles 11-2, 11-3, 11-4, or by holding at least one drive axle 11-1 while the other drive axles 11-2, 11-3, 11-4 are rotated, preferably, but not necessarily, in the same direction of rotation. Of course, these options for tensioning can also be combined. In the tensioned state, the drive motors 12-1, 12-2, 12-3, 12-4 cannot be turned any further with a certain, prespecified or configured torque whereby the play and the elasticities have been overcome. This torque is of course limited by the drive motors 12-1, 12-2, 12-3, 12-4 and/or components of the drive axles 11-1, 11-2, 11-3, 11-4 to prevent damage or overload.

The tensioning can also be carried out in such a way that the drive axles 11-1, 11-2, 11-3, 11-4 are first tensioned with a first torque, in order to ensure that the play and the elasticities have actually been overcome and that tensioning is actually taking place against the stationary coupling part 28, for example, a ring gear 16. This first torque must of course be selected in such a manner that the play and the elasticities are reliably overcome. After this initial first torque, the tensioning can be completed with a second torque which is lower in comparison to the first torque. The lower second torque results in a higher torque reserve for the control of the drive axles 11-1, 11-2, 11-3, 11-4. The transition from higher first torque to lower second torque can take place in any arbitrary manner, for example, in steps or continuously.

The tensioning can in principle be performed in any arbitrary manner, for example, with a rotation speed control, torque control or position control of the drive axles 11-1, 11-2, 11-3, 11-4 in the drive control unit 24-1, 24-2, 24-3, 24-4. If a desired torque for tensioning is to be set for each drive axle 11-1, 11-2, 11-3, 11-4, then a torque control is preferably used, that is, the drive amplifiers 20-1, 20-2, 20-3, 20-4 of the drive axles 11-1, 11-2, 11-3, 11-4 set a desired tensioning torque, for example a tensioning torque which is prespecified or configured by the adjustment control unit 21 or the main controller 22. It is also possible to specify that the total torque of all the generated drive torques of the individual drive axles 11-1, 11-2, 11-3, 11-4 does not have to be zero. A residual torque can also be set against the desired direction of rotation of the movable part, which then serves as a braking torque in order to act as a damping against the externally acting wind. During the tensioning, the drive axles 11-1, 11-2, 11-3, 11-4 are rotated until the mechanical play and the elasticities are overcome, which could also be achieved with a speed or position control.

The tensioning by a torque control can sometimes take a relatively long time. In order to improve this, the relative positions required for reaching a certain tensioning state (torque for tensioning) can be determined in advance. Then the tensioning could also be carried out simply by a position control, wherein position controllers of the drive axles 11-1, 11-2, 11-3, 11-4 are given the required target positions in order to reach the relative positions. In this case, a rough positioning by position control, which can be carried out very quickly, could also be used, followed by a fine positioning by the torque control, in order to fine-tune the torque.

In this way, the tensioning could be carried out much more quickly than with pure torque control.

In order to determine the required relative positions, the at least one drive axle 11-1 could be rotated relative to the other drive axles 11-2, 11-3, 11-4 when there is no load on the adjustment device 10, and the torque achieved in the process, as well as the relative position achieved, could be recorded. One could of course also set a certain torque (for example by the torque control) and record the associated relative position or, conversely, move to a certain relative position and record the resulting torque. This could be done for several points on a resulting torque/relative position curve. This could be used to interpolate between the recorded points or to fit a regression curve into the recorded points in order to obtain a characteristic curve over the torque range. This determination could also be carried out for different temperatures. In this way, one could quickly determine and set the required relative positions for a desired torque for tensioning from the determined relationship, possibly also depending on different temperatures. The determination of this relationship could also be repeated at certain time intervals in order to take into account changed operating states and/or any influences of aging or wear. The determined relationship is of course stored in a suitable manner, for example as a table, curve or characteristic curve, so that it can be accessed during operation.

Figure 4:
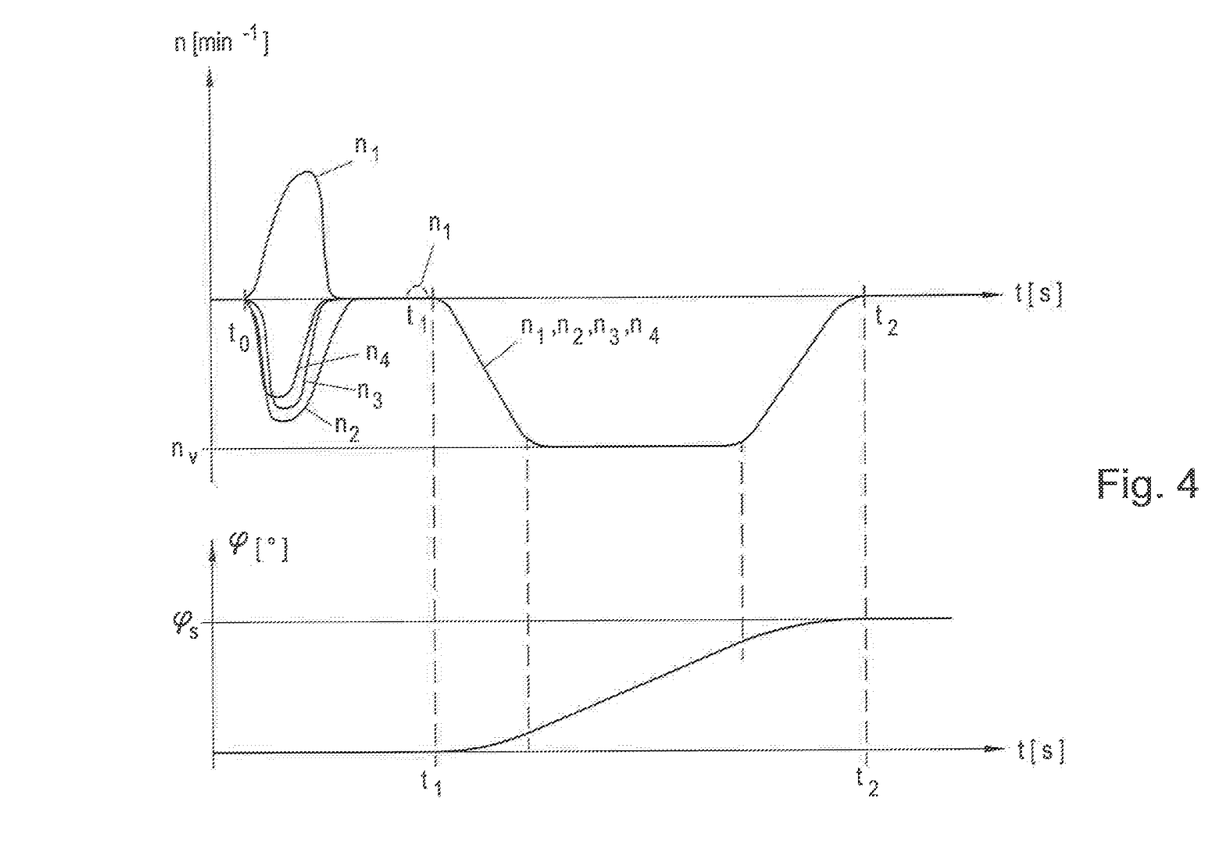
FIG. 4 shows an adjustment of the adjustment device for rotating the movable part.

In the example in FIG. 4, the speeds $n_1$, $n_2$, $n_3$, $n_4$ of the four drive axles 11-1, 11-2, 11-3, 11-4 are shown. It can be seen that the first drive axle 11-1 sets a speed $n_1$ which is opposite to the speeds $n_2$, $n_3$, $n_4$ of the other drive axles 11-2, 11-3, 11-4. In the tensioned state, the drive motors 12-1, 12-2, 12-3, 12-4 cannot be rotated any further with a certain, predetermined or configured torque, which is why the speeds $n_1$, $n_2$, $n_3$, $n_4$ of the four drive axles 11 drop to zero.

In the tensioned state, the adjustment brake 19, if present, is released, which can take a few seconds depending on the configuration. It should be noted here that the tensioning itself can also be carried out with the adjustment brake 19 released or not present. The actual adjustment process is initiated at time $t_1$, for example by the main controller 22. At this point in time, at the latest, the drive axles 11-1, 11-2, 11-3, 11-4 are switched to position control, although preferably before that, for example after the tensioning process has been completed. The position control is carried out in such a manner that the tensioning is maintained. For this purpose, all the drive axles 11-1, 11-2, 11-3, 11-4 are adjusted together in the same direction of rotation while maintaining the tensioning. The tensioning of the drive axles 11-1, 11-2, 11-3, 11-4 should preferably not decrease, at least not too strongly, may however increase. This happens, for example, in such a way that the relative positions of the drive axles 11-1, 11-2, 11-3, 11-4 with respect to each other remain unchanged due to the position control. During the adjustment, the drive axles 11-1, 11-2, 11-3, 11-4 are moved substantially by the same angle of rotation in the same direction of rotation. "Substantially" is used here because, due to unavoidable control inaccuracies, measurement inaccuracies, manufacturing-related deviations in the drive axles 11-1, 11-2, 11-3, 11-4, etc., the angles of rotation in the individual drive axles 11-1, 11-2, 11-3, 11-4 usually will not match exactly.

Figure 5:
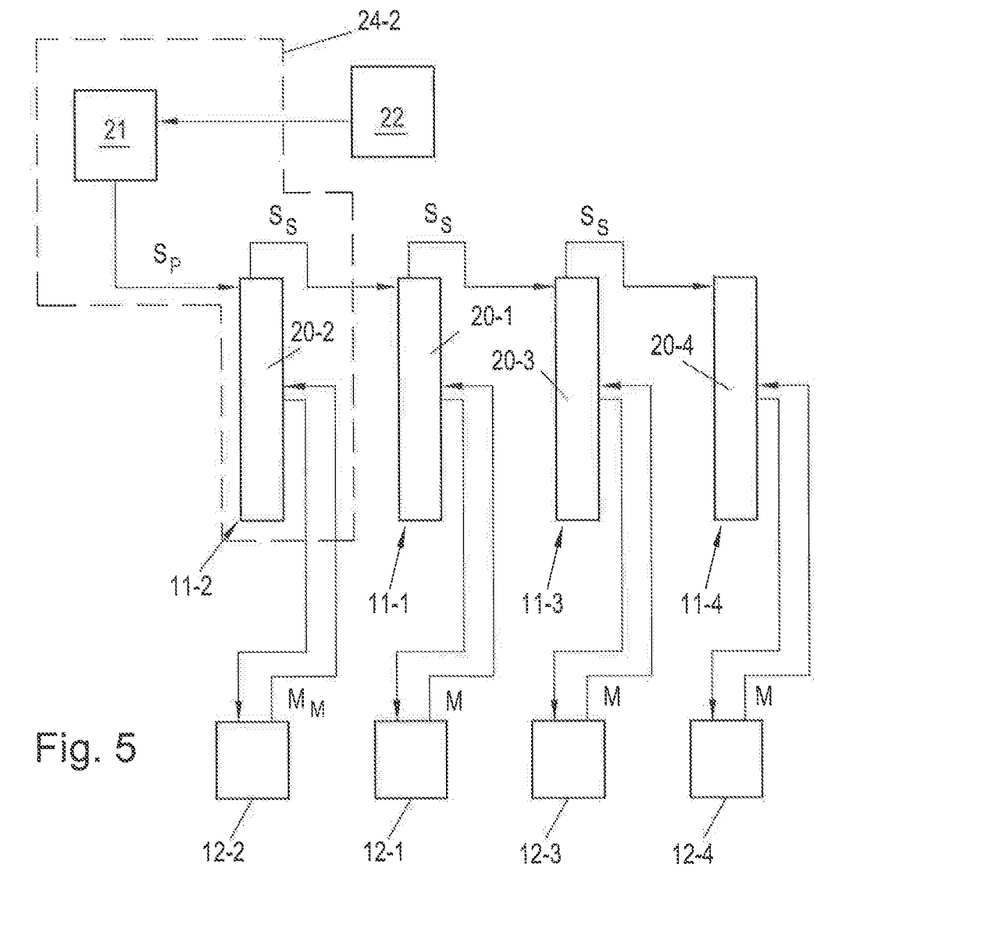
FIG. 5 shows an advantageous embodiment of the control of the drive axles.

In order to improve the position control, a master/slave control can also be implemented, which is explained with reference to FIG. 5, showing the four drive axles 11-1, 11-2, 11-3, 11-4 of the exemplary embodiment, each with a drive amplifier 20-1, 20-2, 20-3, 20-4 and the associated drive motor 12-1, 12-2, 12-3, 12-4 (further components of the drive train, such as the drive transmission 13, are not shown for reasons of simplicity). One drive axle 11-1, 11-2, 11-3, 11-4 is defined as the master drive axle 11-2 and receives the position setpoint S from the adjustment control unit 21. The other drive axles 11-1, 11-3, 11-4 receive the respective position setpoint $S_S$ from the drive amplifier 20-2 of the master drive axle 11-2. The position setpoint $S_S$, which is passed on from the master drive axle 11-2 to the slave drive axles 11-1, 11-3, 11-4 is advantageously the actual angle value $M_M$ detected with the angular position sensor 15 of the master drive motor 12-2. The slave drive axles 11-1, 11-3, 11-4 thus exactly follow the movement of the master drive axle 11-2. However, it is also possible for more than one master drive axle 11-2 to be provided, with a number of slave drive axles 11-1, 11-3, 11-4 being assigned to each master drive axle 11-2. Each master drive axle 11-2 with its slave drive axles 11-1, 11-3, 11-4 is then controlled as described.

In a further embodiment, the position setpoint $S_P$ can also be passed on to all the slave drive axles 11-1, 11-3, 11-4 by the adjustment control unit 21 for controlling the axles.

However, a combination can also be contemplated in which at least one master drive axle 11-2 with at least one slave drive axle 11-1, 11-3, 11-4 is provided, and other slave drive axles 11-1, 11-3, 11-4 receive the position setpoint $S_P$ directly.

To implement the control, the drive amplifiers 20-1, 20-2, 20-3, 20-4 of the drive axles 11-1, 11-2, 11-3, 11-4 can be connected to each other and/or to the adjustment control unit 21 using a suitable communication bus, for example POWERLINK or CAN, for data communication.

Using the position setpoints $S_P$, $S_S$, for example in the form of angles of rotation, and the detected sensor values M (or the angles of rotation derived therefrom) as actual values of the control, the required manipulated variables of the control, e.g. electrical power U, V, W, which are required so that the actual position values follow the position setpoints, are then calculated in the drive amplifier 20 utilizing a controller (such as a proportional-integral-derivative (PID) controller), which is usually implemented as software. Instead of electrical power, another variable can be calculated as a manipulated variable in the drive amplifier 20, such as a duty cycle or pulse/pause ratio in a known PWM (pulse width modulation) control, for example, which is then converted into electrical power in the drive motor 12 itself. In this case, the control and the power electronics (to provide the electrical power) can also be separated. Such a position control in a drive is well known, which is why it need not be discussed in more detail.

For position control of all the drive axles 11-1, 11-2, 11-3, 11-4 for adjusting the adjustment device 10, the adjustment control unit 21 sets a position setpoint $S_P$ which is implemented by the drive axles 11-1, 11-2, 11-3, 11-4, for example, as explained with reference to FIG. 5. The position setpoint $S_P$ of course corresponds to the value that is required to turn the movable part of the wind power plant 1 to the desired end position $\varphi_S$, for example by 10° in the desired direction, by the adjustment device 10.

The implementation can again be done in different ways. For example, a speed ramp can be configured in the master drive amplifier 20-2 in order to implement the set position, for example as shown in FIG. 4. For this purpose, the master drive axle 11-2 can first be accelerated at time $t_1$ at a prespecified or configured acceleration, for example, a maximum possible acceleration, until a prespecified or configured adjustment speed $n_v$ has been reached. A slave drive axle 11-1, 11-3, 11-4 follows this master movement as described above. Of course, all or certain drive axles 11-1, 11-2, 11-3, 11-4 could also receive the position setpoint $S_P$ from the main controller 21 and implement it with the same speed ramp. Instead of a speed ramp, any other speed profile could of course also be implemented. The drive axles 11-1, 11-2, 11-3, 11-4 are decelerated via the configured or pre-specified speed ramp in sufficient time for the desired end position $\varphi_S$, for example a desired angle of rotation, to be reached at the end of the speed ramp. Such speed ramps, or any other speed profile, are easy to calculate.

Alternatively, the adjustment control unit 21 can of course also implement the desired speed profile and specify the rotation angles to be set for the drive amplifiers 20 in predetermined time steps, for example in the millisecond range. A master/slave configuration can again be implemented in which only the master drive amplifier 20-2 receives the angle of rotation to be set and the slave drive axles 11-1, 11-3, 11-4 follow as before, or all the drive amplifiers 20-1, 20-2, 20-3, 20-4 can again receive the rotation angle from the adjustment control unit 21.

However, it is also possible that the main controller 22 merely gives the command for adjustment in the desired direction of rotation to the adjustment control unit 21 (or the drive amplifiers 20-1, 20-2, 20-3, 20-4), and the drive axles 11-1, 11-2, 11-3, 11-4 then accelerate with a certain speed profile until the adjustment speed $n_v$ is reached, and then continue to rotate at the adjustment speed $n_v$ until the main controller 22 gives the command to stop. A corresponding speed profile can then be implemented or configured for stopping, for example braking with maximum deceleration to a standstill. Again, this can also preferably be implemented in a master/slave configuration of the drive axles 11-1, 11-2, 11-3, 11-4.

As can be seen in FIG. 4, the speeds $n_2$, $n_3$, $n_4$ of the drive motors 12-1, 12-2, 12-3, 12-4 are substantially the same (within the achievable accuracy) in the adjustment with position control, because substantially the same angles of rotation are adjusted in order to maintain the tensioning of the drive axles 11-1, 11-2, 11-3, 11-4.

At time $t_2$, the drive motors 12-1, 12-2, 12-3, 12-4 of the drive axles 11-1, 11-2, 11-3, 11-4 were brought to a standstill, thus completing the adjustment movement.

Thereafter, the holding brake 23 of the drive motors 12-1, 12-2, 12-3, 12-4 and/or the adjustment brake 19 of the adjustment device 10, if present, can be closed.

In an advantageous embodiment of the invention, the drive axles 11-1, 11-2, 11-3, 11-4 are tensioned once again prior to the actual adjustment, i.e. before time $t_1$. Between the initial tensioning and the actual adjustment, for example while the adjustment brake 19 is being opened, an uncontrolled movement of the adjustment device 10 can occur due to the externally acting wind load. This can undesirably change the state of tensioning, which can have a negative impact on the subsequent adjustment. In order to prevent this, a drive axle 11-1, or also several or all the drive axles 11-1, 11-2, 11-3, 11-4, can be tensioned once again in order to restore a defined tensioning state, for example, a desired total torque. In the embodiment according to FIG. 4, the first drive axle 11-1 is tensioned again by activating the drive motor 12-1 of the first drive axle 11-1 again in the predetermined direction of rotation, until the desired tensioning state is reached.

It can also be advantageous if the tensioning of the drive axles 11-1, 11-2, 11-3, 11-4 is repeated again after the completed adjustment movement in order to once again establish a defined tensioning state. Repeating does not necessarily mean that tensioning is carried out with the same torques or in the same manner as at the beginning of the adjustment movement, but merely that the drive axles 11-1, 11-2, 11-3, 11-4 are tensioned once again. The time required for tensioning before the next adjustment movement can thus advantageously be shortened. This re-tensioning after the completed adjustment movement can take place before or after the closing of an optionally-present holding brake 23 of the drive motors 12-1, 12-2, 12-3, 12-4 and/or adjustment brake 19 of the adjustment device 10.

A further advantage of the invention can be seen in that the holding of the movable part of the wind power plant 1 is possible using only the drive axles 11-1, 11-2, 11-3, 11-4 of the adjustment device 10. In particular, an adjustment movement in spite of the wind is thus possible with the adjustment brake 19 of the adjustment device 10 fully open. However, this can also be used to hold the movable part of the adjustment device 10, as explained below.

As already stated, the movable part can be braked by an adjustment brake 19 and/or by the friction in a plain bearing as a bearing 17, and/or by holding brakes 23 in the drive axles 11-1, 11-2, 11-3, 11-4. In all cases, it may happen that the external wind load becomes so high, for example, in the case of a typhoon at an offshore wind power plant, that the braking torque applied is overcome and the movable part of the wind power plant 1 is rotated in an uncontrolled manner by the acting wind. This is exacerbated by the inevitable wear in an adjustment brake 19 or holding brake 23, because the braking action can decrease with increasing wear. In order to solve or at least alleviate this problem, the drive axles 11-1, 11-2, 11-3, 11-4 can also be used according to the invention for holding the movable part, for example for braking support.

Figure 6:
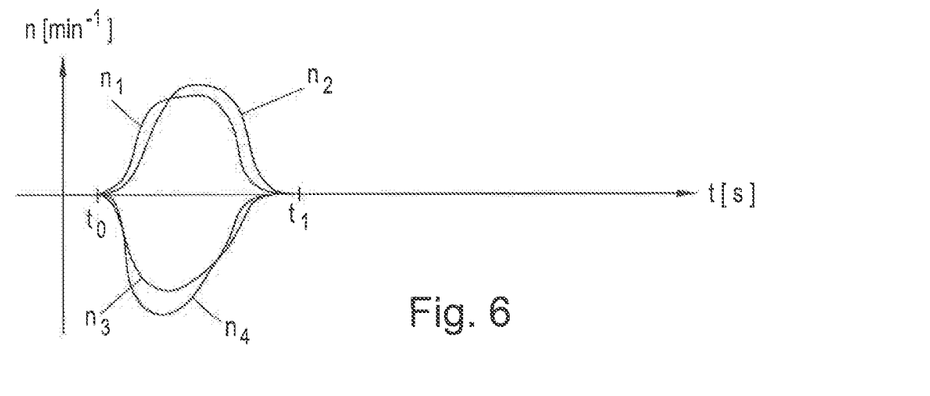
FIG. 6 shows a tensioning of the drive axles for holding the movable part.

For holding, it is assumed that the drive axles 11-1, 11-2, 11-3, 11-4 are tensioned at the start of the holding, at time $t_1$, as described above. For holding, it is advantageous to divide the drive axles 11-1, 11-2, 11-3, 11-4 preferably evenly during the tensioning, that is, for example, to rotate the same number of drive axles 11-1, 11-2 in one direction and the same number in the other direction, because the wind can rotate the movable part in both directions. In the case of four drive axles 11-1, 11-2, 11-3, 11-4, as in FIG. 3, two drive axles 11-1, 11-2 would preferably be rotated in one direction for tensioning and the other two drive axles 11-3, 11-4 would be rotated in the other direction, as shown in FIG. 6. Likewise, for holding the movable part a total torque of zero is preferably set for tensioning.

When the drive axles 11-1, 11-2, 11-3, 11-4 are tensioned, the set tensioning of the drive axles 11-1, 11-2, 11-3, 11-4 is now maintained by the control to hold the movable part (again within the achievable accuracy). This can advantageously be done again with position control, but can also be done with torque control or speed control. As long as the tensioning is maintained, the movable part of the wind power plant 1 will not move. During the control used for maintaining the tensioning, the drive axles (11-1, 11-2, 11-3, 11-4) can subsequently move in order to compensate for any external disturbance of the tensioning caused by the wind.

However, if the external force due to the acting wind is too high, such that the tensioning is overcome by the wind, the movable part may move. The holding can therefore only be ensured up to a certain wind load, which in turn depends on the set tensioning state. Such a movement of the movable part can be accepted or can be corrected again by the control. For example, a higher-level control of the position of the movable part could be provided in the drive control unit 24-1, 24-2, 24-3, 24-4, and be used to move to the initial position of the movable part at the beginning of the holding process. This movement could be implemented as described above for adjusting the movable part.

For example, for each drive axle 11-1, 11-2, 11-3, 11-4, a target position can be specified as the position target value $S_P$, which corresponds to the initial position at the start of the holding or after the tensioning. For this purpose, for example, the respective initial position can be prespecified to each of the drive axles 11-1, 11-2, 11-3, 11-4 as the position setpoint $S_P$. The drive axles 11-1, 11-2, 11-3, 11-4 are thus held in the initial position by the position control, and any external disturbances caused by wind are accordingly corrected. If, despite the activated drive axles 11-1, 11-2, 11-3, 11-4, there is an unwanted rotation of the movable part due to the acting wind, the position control can be used to restore the initial position and correct a rotation of the movable part. However, the control can also be based on the relative positions of the drive axles 11-1, 11-2, 11-3, 11-4 with respect to each other, which would allow a rotation of the movable part. Such a rotation of the movable part could be compensated for by a higher-level control of the position of the movable part.

The movable part can also be held when the adjusting brake 19 is closed, by which a support the adjustment brake 19 would be realised, if the movable part is held when the adjustment brake 19 is open, or in an adjustment device 10 without an adjustment brake 19, the drive axles 11-1, 11-2, 11-3, 11-4 can also generate the braking effect for holding the movable part against the acting wind alone.

However, the holding can also be achieved with a speed control. For this purpose, for example, a speed of zero for the drive axles 11-1, 11-2, 11-3, 11-4 can be prespecified as a setpoint which is then implemented by the control of the drive axles 11-1, 11-2, 11-3, 11-4. An external disturbance caused by wind, which can result in rotation, is compensated for in this way. In the same way, this can be achieved with a torque control, that compensates a torque acting externally on the movable part. In these cases, too, a rotation of the movable part can be compensated for by a control, for example by a higher-level control of the position of the movable part.

Regardless of whether a position control, speed control or torque control is used, the goal is to hold the movable part of the adjustment device 10 against the acting wind by the drive axles 11-1, 11-2, 11-3, 11-4, which is possible up to a certain wind load.

Since the drive motors 12-1, 12-2, 12-3, 12-4 are typically cooled with a fan on the motor shaft that does not rotate at standstill or only rotates slowly at low speeds, the temperature of the drive motors 12-1, 12-2, 12-3, 12-4 can preferably also be monitored to avoid thermal overload. In order to keep the thermal load on the drive motors 12-1, 12-2, 12-3, 12-4 as low as possible, the holding brakes 23 can be closed again if no control intervention is required. It is also conceivable to signal a warning of thermal overload to the main controller 22 and/or the adjustment control unit 21. In this case, the holding of the drive axles 11-1, 11-2, 11-3, 11-4 can be interrupted.

To perform the holding of the drive axles 11-1, 11-2, 11-3, 11-4, the main controller 22 can issue a holding command to the drive control unit 24, or to the adjustment control unit 21 of the drive control unit 24. The drive control unit 24 then ensures that the drive axles 11-1, 11-2, 11-3, 11-4 are tensioned, provided that these are not already in the tensioned state. The tensioning is performed, for example, as described above. By way of example, after the tensioning or after the command to hold is received, the initial positions of all the drive axles 11-1, 11-2, 11-3, 11-4 are stored and held by the position control up to a configured maximum torque of the drive motors 12-1, 12-2, 12-3, 12-4, which can also reach the maximum torque of the drive transmission 13-1, 13-2, 13-3, 13-4 and/or the maximum torque to be transmitted.

This holding can also compensate, by the drive axles 11-1, 11-2, 11-3, 11-4, for braking function lost due to wear. In addition, a braking system of the wind power plant, for example an adjustment brake 19, can also be smaller by design, and therefore more cost-effective.

At least one memory (not shown), e.g., a non-transitory computer readable medium or media, can be provided to store a set of instructions that can be executed by a processor of drive control unit 24 to perform any of the methods or computer based functions disclosed herein, either alone or in combination with the other described devices, and/or a processor of main controller 22 to perform any of the methods or computer based functions disclosed herein, either alone or in combination with the other described devices. The at least one memory, accessible by the processors, can be part of drive control unit 24, part of main controller 22 or remote from drive control unit 24 and main controller 22, e.g., a remotely located server, memory, system, or communication network or in a cloud environment. Further, the above-identified at least one memory, or one or more such separate memories, can be provided to store a set of instructions that can be executed by a processor of adjustment control unit 21 and/or a processor of drive amplifier 20 to perform any of the methods or computer based functions disclosed herein, either alone or in combination with the other described devices. The processor of adjustment control unit 21 and/or of processor of drive amplifier 20 can be provided in a same processor or in separate processors and/or even the same processor of drive control unit 24. Adjustment control unit 21 and/or a processor of drive amplifier 20 can include a memory accessible by their associated processors, or the instructions for adjustment control unit 21 and/or drive amplifier 20 can be stored in a memory in the drive control unit 24 or in one or more memories residing remotely from drive control unit 24, e.g., a remotely located server, memory, system, or communication network or in a cloud environment.

Moreover, in addition to the foregoing, it is to be understood and those skilled in the art will readily appreciate that the blocks and/or modules illustrated in at least FIGS. 1-3 and 5 are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. Further, these blocks and/or modules can be formed by analog instrumentation, e.g., analog electric/electronic circuits, analog computers, analog devices, etc., and/or can be formed as application specific integrated circuits (ASICs) or other programmable integrated circuits, and, in the case of the blocks and/or modules, which can be implemented by microprocessors or similar, they may be programmed using software (e.g., microcode) to perform various functions discussed herein and may optionally be driven by firmware and/or software. Alternatively, each block and/or module may be implemented by dedicated hardware, or as a combination of dedicated hardware to perform some functions and a processor (e.g., one or more programmed microprocessors and associated circuitry) to perform other functions.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for adjusting an adjustment device of a wind power plant to rotate a movable part of the wind power plant, the adjustment device having at least two drive axles, each having a drive motor and being mechanically coupled to the movable part, the method comprising:
    tensioning the at least two drive axles against each other prior to an adjustment by rotating at least one drive axle of the at least two drive axles relative to at least the other drive axle of the at least two drive axles; and
    during the adjustment, using position control of the at least two drive axles to rotate the at least two drive axles together in a same direction of rotation, while maintaining the tensioning of the at least two drive axles, until a desired end position of the movable part is reached.

2. The method according to claim 1, wherein the tensioning is carried out by rotating at least one drive axle in the direction of rotation opposite that of the other drive axles.

3. The method according to claim 1, wherein the tensioning is carried out by rotating all the drive axles in the same direction of rotation, wherein at least one drive axle is rotated more slowly than the other drive axles.

4. The method according to claim 1, wherein the tensioning is carried out by holding at least one drive axle while the other drive axles are rotated.

5. The method according to claim 1, wherein the tensioning is maintained by maintaining the relative positions of the drive motors with respect to each other reached during tensioning of the drive axles.

6. The method according to claim 1, wherein, during tensioning, a desired total torque is set as the sum of the individual drive torques of the drive axles.

7. The method according to claim 6, wherein the total torque counteracts the desired movement of the movable part.

8. The method according to claim 1, wherein at least one drive axle is defined as master drive axle and a number of the other drive axles follows the movement of the master drive axle.

9. The method according to claim 1, wherein the drive axles are re-tensioned between the initial tensioning and the start of the adjustment.

10. The method according to claim 1, wherein the at least two drive axles are rotated together via a position control.

11. A wind power plant having a movable part, comprising:
    an adjustment device configured to rotate the movable part, the adjustment device having at least two drive axles, each having a drive motor and being mechanically coupled to the movable part;
    wherein at least one of the at least two drive axles is rotated relative to at least the other drive axle of the at least two drive axles for tensioning the at least two drive axles, and
    wherein a rotation of the at least two drive axles in a same direction of rotation is controlled using position control of the at least two drive axles, while maintaining the tensioning of the at least two drive axles, until a desired end position of the movable part is reached.

12. The wind power plant according to claim 11, wherein the adjustment device is at least one of a wind direction tracking mechanism or a rotor blade adjustment mechanism.

13. The wind power plant according to claim 11, further comprising a drive control unit configured for tensioning the at least two drive axles.

14. The wind power plant according to claim 13, further comprising a position control of the at least two drive axles configured to control rotation of the at least two drive axles to the predetermined set points,
    wherein the drive control unit comprises the position control.

* * * * *